(12) United States Patent
Hammad-Randolph

(10) Patent No.: US 10,779,549 B1
(45) Date of Patent: Sep. 22, 2020

(54) TENDERIZING APPARATUS WITH FLUID RESERVOIR

(71) Applicant: Omar Waleed Hammad-Randolph, West Palm Beach, FL (US)

(72) Inventor: Omar Waleed Hammad-Randolph, West Palm Beach, FL (US)

( * ) Notice: Subject to any disclaimer, the term of this patent is extended or adjusted under 35 U.S.C. 154(b) by 288 days.

(21) Appl. No.: 15/657,103

(22) Filed: Jul. 21, 2017

Related U.S. Application Data

(60) Provisional application No. 62/365,163, filed on Jul. 21, 2016.

(51) Int. Cl.
  *A22C 9/00* (2006.01)
  *A23L 13/70* (2016.01)

(52) U.S. Cl.
  CPC .............. *A22C 9/001* (2013.01); *A23L 13/72* (2016.08); *A23V 2002/00* (2013.01)

(58) Field of Classification Search
  CPC .................................. A22C 9/00; A22C 9/001
  USPC .................................................. 452/141–145
  See application file for complete search history.

(56) References Cited

U.S. PATENT DOCUMENTS

| | | | | |
|---|---|---|---|---|
| 3,535,734 A * | 10/1970 | Ross ...................... | A22C 9/008 |
| | | | 452/141 |
| 4,199,841 A * | 4/1980 | Jaccard .................. | A22C 9/008 |
| | | | 30/305 |
| 4,463,476 A * | 8/1984 | Jaccard ................... | A22C 9/008 |
| | | | 452/146 |
| 2005/0239388 A1* | 10/2005 | Gorowski .............. | A22C 9/008 |
| | | | 452/141 |
| 2009/0111367 A1* | 4/2009 | Bolzacchini ........... | A22C 9/008 |
| | | | 452/141 |
| 2009/0311957 A1* | 12/2009 | Ferencik ................. | A47J 43/16 |
| | | | 452/146 |
| 2011/0070815 A1* | 3/2011 | Spillner ................. | A22C 9/008 |
| | | | 452/141 |
| 2012/0270485 A1* | 10/2012 | Doyle .................... | A22C 9/001 |
| | | | 452/144 |

* cited by examiner

*Primary Examiner* — Richard T Price, Jr.
(74) *Attorney, Agent, or Firm* — Diana Mederos; DiSchino & Schamy, PLLC

(57) ABSTRACT

A system comprising a tenderizing apparatus with a fluid reservoir provides users an efficient way to simultaneously tenderize and marinate food. The tenderizer with a fluid reservoir generally includes a fluid outlet or valve and a tensioning element. A fluid reservoir receives marinade. Activation of the system by applying downward pressure releases marinade into an injector. The injector is inserted into the target food. Substantially simultaneously, activation results in at least one projection penetrating the surface of the target food. When downward pressure is released, the injector and projection retract. A first portion and a second portion are separated for easy cleaning. A removably attached first portion cover and third cover provide easy storage.

20 Claims, 23 Drawing Sheets

TENDERIZING APPARATUS WITH FLUID RESERVOIR

PRIORITY CLAIM

This non-provisional application claims the benefit of U.S. Provisional Patent Application Ser. No. 62/365,163, filed on Jul. 21, 2016, the entire contents of which is incorporated herein by this reference.

FIELD OF THE DISCLOSURE

The present invention relates to systems and methods for tenderizing food. Specifically, the system comprises an apparatus comprising a tenderizing device and a fluid reservoir. The system may include ready-to-use marinade packs to be used in conjunction with the apparatus for substantially simultaneously tenderizing and marinating food.

BACKGROUND

Marinades are surface treatments used to impart flavor on a variety of different foods, such as pork, beef and poultry. When marinating meat, generally the thicker the cut the less that the marinade that penetrates the food. Most marinades are thin liquids that sit on foods before cooking but do not penetrate the food. They coat the surface of the food, but do not tenderize the food and only impart a limited flavor into the food.

Salt is one ingredient that will permeate through the meat. However, after hours of marinating meat even with salt the marinade usually penetrates approximately ⅛ of an inch of the meat. The remainder of the food does not get flavored by the marinade. The food can sometimes become overly tender and mealy where the marinade has penetrated, while the inside remains untouched. In fact, when food including but not limited to beef and poultry are marinated and then refrigerated, the molecules move more slowly and the marinade generally penetrates even less of the meat and has less of an impact on the meat.

Also, in some cases there is a significant amount of acidity in the marinade. If the meat or poultry is marinated for a significant amount of time, the meat or poultry can become mealy and the marinade can denature the protein which can change the flavor as well as the texture of the meat or poultry.

There are presently limitations and drawbacks to the methods and apparatuses which are available to assist in tenderizing and adding particular flavors to food. For example, a marinating solution may be salt, phosphates and water, or may consist of more complex flavors with seasonings, starches, vegetable or dairy proteins, acids, antimicrobials and antioxidants. People often marinate with separate pieces of equipment such as injectors, tumblers and then after the food has marinated will use equipment to tenderize such as a massager or a separate tenderizer. Another limitation and drawback to the devices that are available today is that they do not reliably result in eye appealing, flavorful, tender and juicy meat or poultry as well as other types of foods such as meat substitutes like tofu and tempeh. The person marinating and tenderizing the food must know what different marinades will do to particular foods; for example, some will make the meat mealy while the meat sits in a particular marinade and if the meat is not tenderized at the right time will sacrifice the flavor and texture of the meat. Another limitation and drawback to devices that are available today is that foods will have to be stored in the refrigerators while they are marinating and then tenderized either before or after the good has marinated. There is a lot of waste, and containers are needed to store the food. There are also general space issues as the good has to be marinated in the refrigerator. Also, the devices that are available today for raw food, including but not limited to meats and poultry, have to be handled directly by an individual multiple times to marinade and tenderize the food. This results in more safety issues for the individual that is handling raw food. Also, a person cannot marinade and tenderize food in a short period of time as the food must be marinated and then tenderized separately.

Previous attempts have been made to design a system for simultaneously tenderizing and marinating food, but those attempts have produced inferior flavor infusion and tenderizing. Some handheld tenderizing and marinating systems rely on pumping, rolling, squeezing, and rotating at least one portion of the device in addition to manually applying pressure to marinate and tenderize food. These devices are difficult to use and require much effort. These devices are not helpful in restaurant settings where work is repetitive and time is short. Furthermore, many handheld tenderizing and marinating apparatuses commercially available have too many parts that are difficult to clean.

SUMMARY OF THE INVENTION

What is needed is a system for simultaneously tenderizing and marinating food with apparatuses that are easy to clean and store and that do not require undue fatigue.

In one embodiment, the system includes a food tenderizer with a fluid reservoir which includes a first portion having a fluid outlet, a second portion having a first end and a tensioning element. The first end may be sized to receive fluid from the first portion upon activation of the tensioning element. A second end which may have a second portion having at least one projection extending downwardly from the second end of the second portion. The second end of the second portion may also have an injector extending downwardly from the second end of the second portion.

In another embodiment, the food tenderizer with a fluid reservoir may have a first portion with a fluid outlet which is subjacent to the first portion. The second portion may have at least one projection wherein actuation causes fluid to be injected into the food and the at least one projections extends downward.

A fluid reservoir receives marinade. Activation of the system by applying downward pressure releases marinade into an injector. The injector is inserted into the target food. Substantially simultaneously, activation results in at least one projection penetrating the surface of the target food. When downward pressure is released, the injector and projection retract.

A first portion and a second portion are separated for easy cleaning.

A removably attached first portion cover and third cover provide easy storage.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

REFERENCE NUMERALS OF THE DRAWINGS

Figure 1:
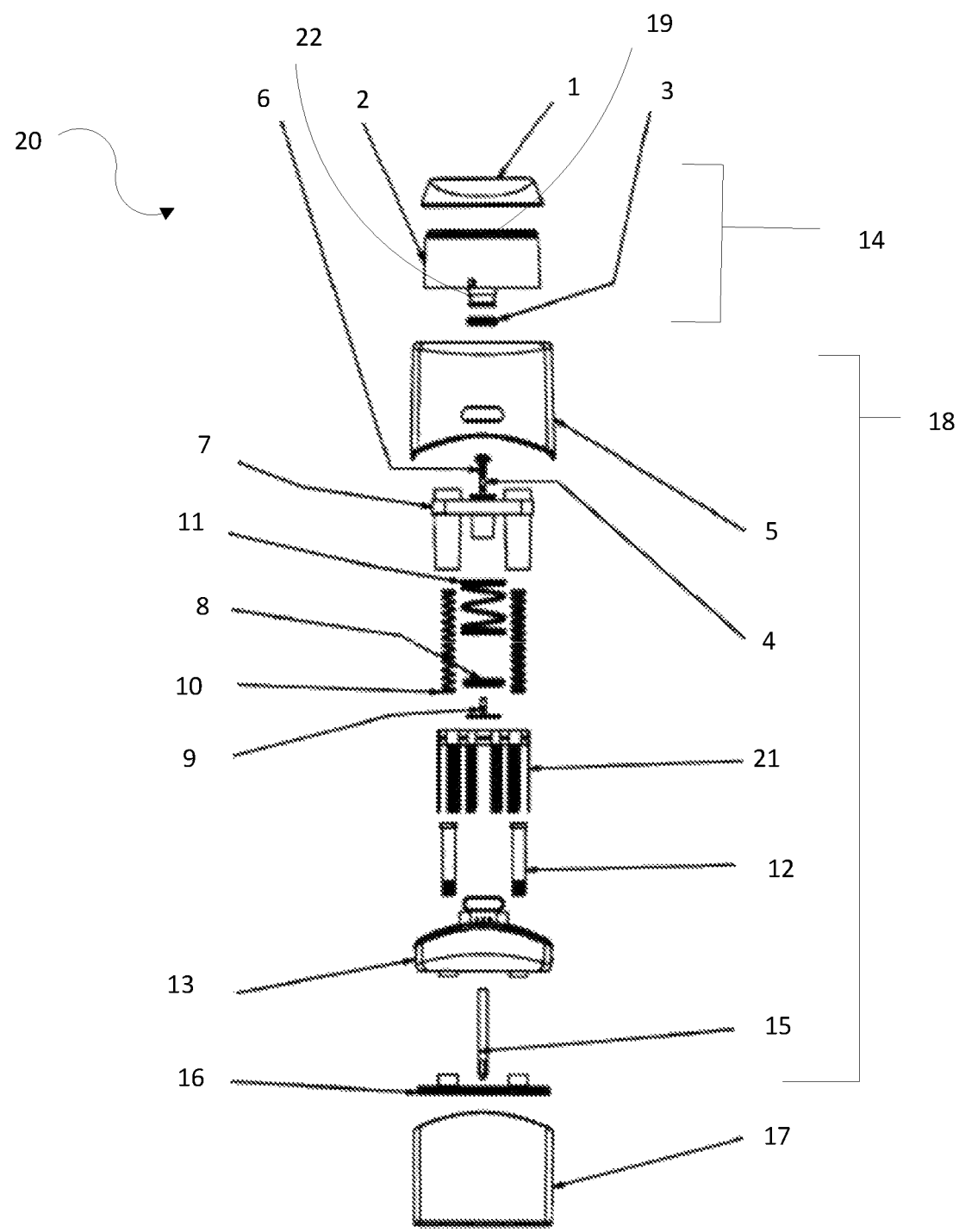
FIG. 1 shows an exploded schematic of a tenderizing apparatus with fluid reservoir.

1. First portion cover
2. Substantially cylindrical portion
3. Seal
4. Valve
5. Second portion cover
6. Securing device
7. Platform
8. Second seal
9. Second valve
10. Tensioning element
11. Second tensioning element
12. Guide
13. Base
14. First portion
15. Injector
16. Second platform
17. Third cover
18. Second portion
19. Liquid reservoir
20. Tenderizing apparatus with fluid reservoir (system)
21. Projection
22. Tapered area
23. Locking mechanism
24. Marinade packet
25. Food

DETAILED DESCRIPTION

Injecting marinades directly into the meat or poultry is more effective at enhancing flavor and improving the "juiciness" of food. Tenderizing is a process which can make proteins softer by softening both the proteins in muscle fibers and in connective tissues that sheath the fibers and connect them to bones. This can also be applied to different types of food as well. Since marinades do not penetrate deep into a cut of meat for example, they do not denature the protein bonds much beyond the surface. Accordingly, there is often little tenderizing beyond the surface unless the meat is tenderized with a tenderizer.

The present invention quickly and effectively tenderizes food while also and adding flavor internally to the food. A single apparatus is able to achieve both of these functions and leaves the target food succulent with the flavor of the marinade throughout the food. As used herein, relational terms, such as "first" and "second," "over" and "under," "front" and "rear," "in, within, and around" and the like, may be used solely to distinguish one entity or element from another entity or element without necessarily requiring or implying any physical or logical relationship or order between such entities or elements. The tenderizing apparatus with fluid reservoir described herein provides for an easy and convenient system for tenderizing food while also injecting fluid into food.

Now referring to the drawings in which like reference designators refer to like elements, there is shown in FIG. 1 a tenderizing apparatus with fluid reservoir constructed in accordance with the principles of the present invention and designated generally as 20 and also referred to as the system 20. The tenderizing apparatus with a fluid reservoir 20 system may be used with a variety of different types of food including, but not limited to pork, beef, poultry, tofu, tempeh, vegetables, roots and tubers, and cheeses. The tenderizing apparatus with fluid reservoir 20 may generally include three separate portions, with the second portion further separated into a platform portion and a base portion.

In FIG. 1, the tenderizing apparatus with a fluid reservoir 20 may include a first portion 14 and a first portion cover 1. The first portion cover 1 may be a lid which may be able to screw on and off or pop on and off. The first portion cover 1 may also be secured in other ways as well and may not be specifically limited to a lid. The first portion cover 1 may create a seal when it is secured to the first portion 14.

The first portion cover 1 may be made of high density polyethylene or another type of plastic or material which can be used when cooking and is food safe. The material may be able to withstand heat as well as cool temperatures. The material will also be strong enough to withstand the pressure that may be applied by a user to the tenderizing apparatus with fluid reservoir 20. The first portion cover 1 may come in different sizes depending on the particular user. A user may be able to select the size of the first portion cover 1 which the user finds desirable to use and depress with the hand or with one finger. The first portion cover 1 may also contain indentations for the user's fingers or indentations for the palm of the hand so that pressure can be applied to the first portion cover 1 with a single finger or with the palm of the hand.

The first portion 14 as shown in FIG. 1 may also include an at least substantially cylindrical portion 2. The at least substantially cylindrical portion 2 may also include a liquid reservoir 19 at one end. The liquid reservoir 19 can be a variety of different sizes designed to accommodate a different amount of liquid. The liquid reservoir 19 can be sized to receive a significant amount of liquid or it may be designed to receive a small amount of liquid. The at least substantially cylindrical portion 2 may also include a lip around the exterior of the first (top) end to keep any liquid that is put into the reservoir from spilling once it is placed into the at least substantially cylindrical portion 2.

The at least substantially cylindrical portion 2 may include a tapered area 22 at the second (bottom) end. The tapered area 22 may be at least substantially cylindrical but smaller in size than the liquid reservoir 19 at the first end. The tapered area 22 may be a variety of different sizes and is not limited by the size and shape as seen in FIG. 1. The tapered area 22 may be a core, nozzle, drain, spout, or opening and may be integrated with a seal 3 or flap.

The at least substantially cylindrical portion 2 may be made of high density polyethylene or another type of plastic or material which can be used when cooking and is food safe. The material will able to withstand heat as well as cool temperatures. The material will also be strong enough to withstand the pressure that may be applied with a user applies pressure to the at least substantially cylindrical portion 2 or the tenderizing apparatus with fluid reservoir 20.

The first portion 14 may also include a seal 3. The seal 3 may prevent leakage, contain pressure and exclude contamination. The seal 3 may be adhere to the tapered area which may be at the second end of the at least substantially cylindrical portion 2. The seal 3 may be designed to contain fluid within the at least substantially cylindrical portion 2. The seal 3 may be but is not limited to a one-way valve or flap. The seal 3 may be made of rubber or another material which may prevent leakage, contain pressure and exclude contamination.

The tenderizing apparatus with fluid reservoir 20 as shown in FIG. 1 may also contain a second portion 18. The first portion 14 may be releasably secured to the second portion 18 or the first portion 14 may be permanently secured to the section portion 18. The second end of the first portion 14 may be secured in some manner to the first end of the second portion 18.

The second portion 18 may also include a second portion cover 5. The second portion cover 5 may be sized to cover a variety of different items. The second portion cover 5 may also be designed to fit into the hand of a user and may contain grooves for the hand to make it easier to grip this particular part. For example, the second portion cover 5 may include personalized hand grips which are designed to fit the hand of a particular user. The second portion cover 5 may also include an indentation for the palm of a user's hand. This may be designed to fit the hand of a particular user or it may be designed generally to fit the palm or fingers of users.

The second portion cover 5 may be made of high density polyethylene or another type of plastic or material which can be used when cooking and is food safe. The material will able to withstand heat as well as cool temperatures. The material will also be strong enough to withstand the pressure that may be applied with a user applies pressure to the second portion cover 5.

As can be seen in FIG. 1, the second portion 18 may also include a valve 4 may generally regulate, direct, or control the flow of a fluid by opening, closing or partially obstructing a pathway. The valve 4 may be a one-way valve or a two-way valve. The valve 4 may adhere to the first end of the platform 7 or it may sit in an indentation in the platform 7. The platform 7 may be sized to receive the valve 4. The valve 4 may be made out of rubber or other material which can control the flow fluid by an opening, closing or partially obstructed pathway.

The platform 7 may be may be made of high density polyethylene or another type of plastic or material which can be used when cooking. The material will able to withstand heat as well as cool temperatures. The material will be safe to use with food. The material will also be strong enough to withstand the pressure that may be applied with a user applies pressure to the platform 7.

The second portion 18 as shown in FIG. 1 may also include a securing device 6. The securing device 6 may include a variety of different types of screws or nail. The securing device 6 may include, but not be limited to a screw similar or identical to a wood screw, a sheet metal screw or a dry wall screw. Additionally, the securing device 6 may have a variety of different head types. The securing device 6 may be for slotted, Phillips and Square drives, or round versus pan head drives, carriage bolts, flat and oval heads, security heads, which include tamper proof screws, a hex washer head or a truss head. The securing device 6 may also be a machine screw which includes socket screw, allen/hex socket screw or a torx screw, a button head, a flat head, a shoulder screw or a set screw. The securing device 6 may also have a variety of other types of heads and it may be a variety of different sizes. The securing device 6 may be made out of a variety of different materials, which include stainless steel, zinc plating, black oxide, hot dipped galvanized, aluminum and galvanized corrosion screws.

The platform 7 in the second portion 18 as shown in FIG. 1 may have a first end and a second end and may be made of high density polyethylene or another type of plastic or material which can be used when cooking. The material will able to withstand heat as well as cool temperatures. The material will be safe to use with food. The material will also be strong enough to withstand the pressure that may be applied when a user applies pressure to the platform 7. The platform 7 may include four separate parts that are of equal length at the second end. The four separate parts that are of equal length may include at least one tensioning element 10 within each of the four separate parts. The tensioning element 10 may be made to a variety of different tensions and can make the stiffness vary. The tensioning element 11 may be made out of stainless steel or variety of different materials, which include stainless steel, zinc plating, black oxide, hot dipped galvanized, aluminum, and galvanized corrosion material. The tensioning element may be inside the four separate parts of the second end of the platform 7 or may be only in certain portions of the platform 7.

The platform 7 may also include a plurality of downward projections which can be used to house at least one tensioning element 10. For example, one embodiment may comprise four downward projections at the second end.

The second portion 18 may also include a second tensioning element 11. The second tensioning element 11 may be made out of stainless steel or variety of different materials, which include stainless steel, zinc plating, black oxide, hot dipped galvanized, aluminum, and galvanized corrosion material. The second tensioning element 11 may be made to a variety of different tensions and can make the stiffness vary such as from 0.5 psi to 30 psi. The second portion 18 may also include a second seal 8. The second seal 8 may prevent leakage, contain pressure and exclude contamination. The second seal 8 may be adhere to a tapered area at the second end of the platform 7. The second seal 8 may be designed to contain fluid. The second seal 8 may be made of rubber or another material which may prevent leakage, contain pressure and exclude contamination.

The second portion 18 as seen in FIG. 1 may also include a second valve 9. The second valve 9 may generally regulate, direct, or control the flow of a fluid by opening, closing or partially obstructing to pathway. The second valve 9 may adhere to second seal 8 which may be affixed or otherwise secured to the platform 7. The second seal 8 or the platform 7 may be sized to receive the second valve 9 at the second end. The second valve 9 may be a one-way valve. The second valve 9 may be made out of rubber or other material which can control the flow fluid by an opening, closing or partially obstructed pathway.

The second portion 18 may also include at least one guide 12. In FIG. 1 the at least one guide 12 may include four guides which are of equal length and diameter and are attached to the second platform 16 and slideable within the platform 7. The at least one guide 12 may consist of one guide or more than one guide. The at least one guide 12 may extend in different directions and is not limited to extending in one particular direction. Where there are more than one guide, the guides may extend in different directions or may extend in the same direction. The at least one guide 12 may be made of out of stainless steel or variety of different materials, which include but is not limited to stainless steel, zinc plating, black oxide, hot dipped galvanized, aluminum, and galvanized corrosion material. The at least one guide 12 may be strong enough to withstand a significant amount of pressure so that it does not collapse. The at least one guide 12 may be used to guide the platform 7 in different directions.

The second portion 18 may also include a base 13. The base 13 may be made of high density polyethylene or another type of plastic or material which can be used when cooking. The material will able to withstand heat as well as cool temperatures. The material will be safe to use with food. The material will also be strong enough to withstand the pressure that may be applied. The base 13 may be of an at least substantially cylindrical shape but may also be a variety of other shapes including but not limited to a square, semi-circle, rectangle and a variety of other shapes.

The second portion 18 may also include an injector 15. The injector 15 may include a large opening at the top or a small opening. The injector 15 may have a hole in the slide of the injector. The injector 15 may also have a plurality of holes. The injector 15 may also have a sharp point at the tip and may have a sturdy connection between the injector and the base 13. The injector 15 may be secured to the second end of the base 13. The injector 15 may also be removable to allow a user to clean the injector 15 in case it becomes clogged or something becomes lodged in the injector 15. More than one injector 15 may be included. For example, the tenderizing apparatus with fluid reservoir may alternatively include two to 10 injectors of the same or varying lengths and widths. The second portion 18 may also contain more than one injector 15.

The injector 15 may be made out of a material that is not designed to react with the salt. The injector 15 may be made of out of stainless steel or variety of different materials, which include but are not limited to stainless steel, zinc plating, black oxide, hot dipped galvanized, aluminum, and galvanized corrosion material. The injector 15 may be strong enough to withstand a significant amount of pressure so that it does not collapse if it is inserted directly into food.

The second portion 18 may also contain a second platform 16. The second platform may be secured to the second end of the at least one guide 12. The second platform 16 may be designed to accommodate a variety of different shapes and sizes. For example, the second platform 16 may be sized to receive at least one projection 21. The at least one projection 21 may be attached to the base 13 and extend toward the second platform 16.

The second platform 16 may be made of high density polyethylene or another type of plastic or material which can be used when cooking. The material will able to withstand heat as well as cool temperatures. The material will be safe to use with food. The material will also be strong enough to withstand the pressure that may be applied. The second platform 16 may be of an at least substantially cylindrical shape but may also be a variety of other shapes including but not limited to a square, semi-circle, rectangle and a variety of other shapes. The second platform 16 may be capable of allowing the at least one projection 21 to pass through without an obstruction.

The at least one projection 21 may contain a sharp portion which may be used to tenderize food. The at least one projection 21 may contain numerous projections or blades that can be organized, for example, in a linear fashion or a zig-zag fashion or in a concentric fashion or in a staggered fashion, or in a random fashion. There may be from about 1 to about 100 projections depending on the desired length, thickness, and target food desired. For example, the more delicate foods such as tofu and cheese will likely be tenderized and marinated more effectively with thinner and shorter projections or blades 21. The projections or blades 21 may have varying spacing, thickness, and length. Spacing may be from about 1 mm to about 10 mm apart from each projection 21. Thickness may be from about 1 to about 10 mm for each projection 21. The length of each projection 21 may be from about 10 mm to about 200 mm. The at least one projection 21 may contain a sharp edge capable of piercing through different kinds of food. The projections 21 may have ends that are tapered, rounded, pointed, pin-point, or straight. A projection 21 may be an individual blade or a bridge with a plurality of blades, collectively referred to as a projection 21.

The second portion 18 may also contain a third cover 17. The third cover 17 may be designed in a variety of different shapes including but not limited to circular, oval, square or rectangle. The third cover 17 may cover the second platform 16, the injector 15, the at least one projection 21 and may be secured to the base 13. The third cover 17 may be releasably secured to the base in a variety of different ways such as by frictionally, snapping, fitting, or screwing into the base 13. The third cover 17 may be secured to the base 13 with a locking mechanism such as a snap, friction, screw, or press.

Additionally, the tenderizing apparatus with fluid reservoir 20 may also contain a locking mechanism 23 which can prevent the engagement of the device. This locking mechanism 23 such as a snap, friction, screw, or press may be designed to prevent people from using the device including but not limited to children and animals.

Figure 2:
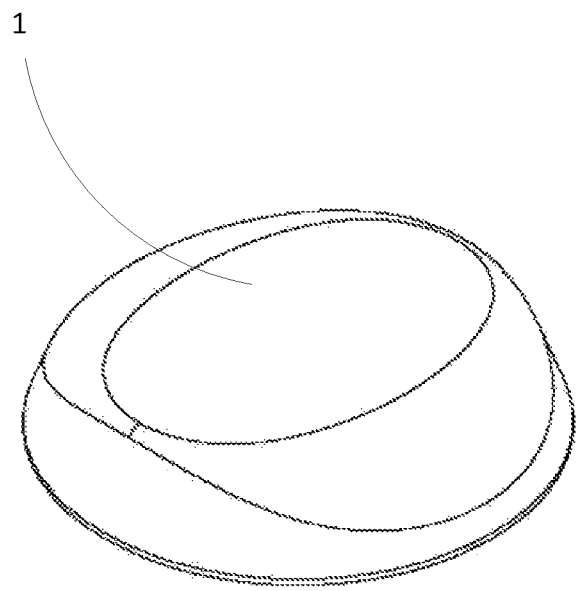
FIG. 2 shows four separate views of a first portion cover of a tenderizing apparatus with fluid reservoir.

FIG. 2 shows the first portion cover 1. The first portion cover 1 may contain a design or text that may be printed on the cover or may be actually molded into the material. The first portion cover 1 may be at least substantially circular in shape and may also contain a variety of other shapes as well. The first portion cover 1 may be screwed, fitted, or snapped onto the substantially cylindrical portion 2. The first portion cover 1 protects and covers the contents in the liquid reservoir 19 and provides a solid platform or grip for activating the system 20.

Figure 3:
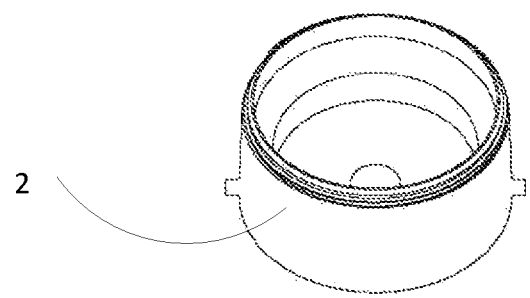
FIG. 3 shows a close-up view of a substantially cylindrical portion and a seal.
Figure 3:
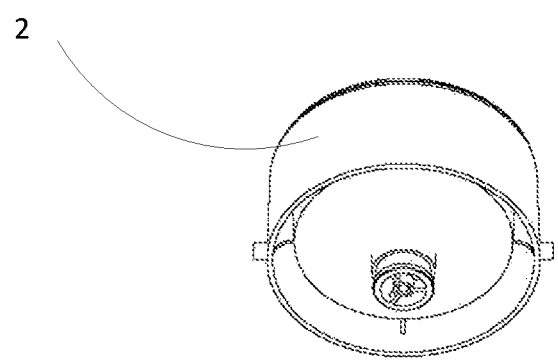

FIG. 3 shows a close-up of the at least substantially cylindrical portion 2 and the seal 3. The at least substantially cylindrical portion 2 may contain a tapered portion at the second end. The tapered portion may only include a portion of the at least substantially cylindrical portion 2 and may also be sized to receive the seal 3. The seal 3 may be larger or smaller than the tapered portion. The at least substantially cylindrical portion 2 may contain a locking mechanism so that the at least substantially cylindrical portion 2 may be secured with the second portion cover 5. This locking mechanism may contain two rectangles which are designed to fit inside a portion of the second portion cover 5. The securing mechanism may also include other designs including but not limited to a depressible circular portion.

Figure 4:
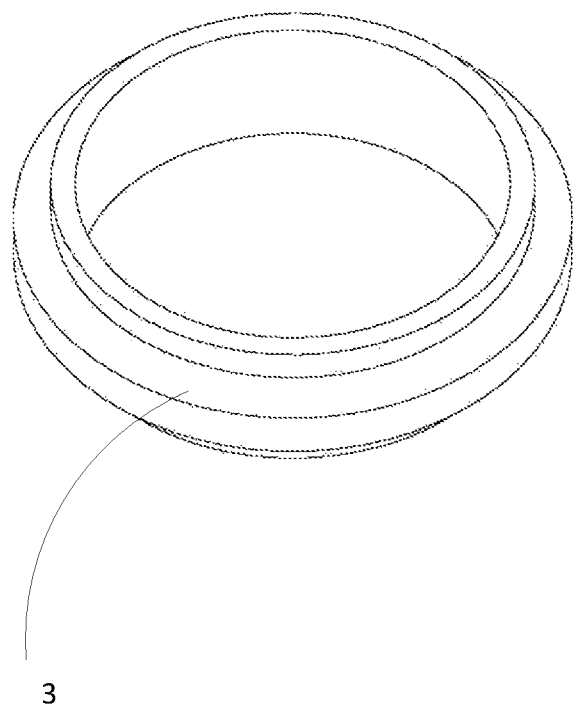
FIG. 4 shows a close-up view of a seal.

FIG. 4 shows a close-up of the seal 3. The seal 3 may be at least substantially circular in shape and may contain an inner and an outer diameter. The seal 3 may fit and secure a tapered area 22 from the substantially cylindrical portion 2 and into or connected to a valve 4 and securing device 6 on the platform 7. The platform 7 and the substantially cylindrical portion may be secured by one seal 3 or multiple seals 3 and protected by the second portion cover 5.

Figure 5:
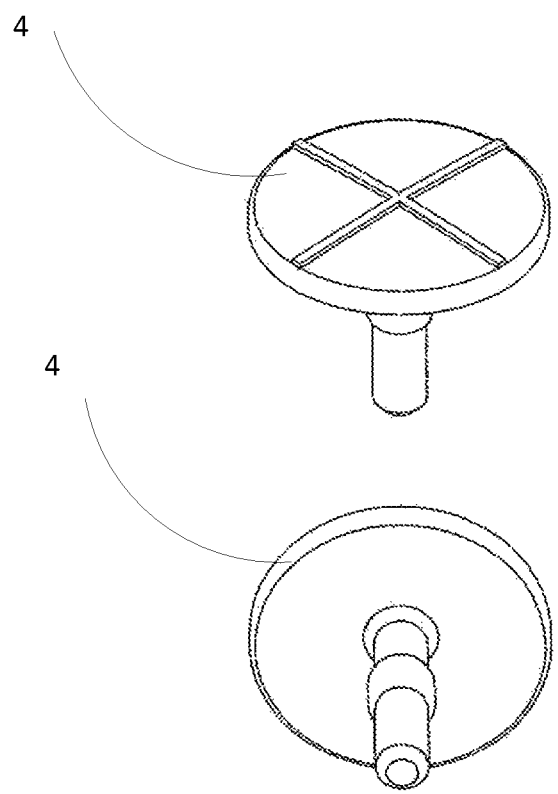
FIG. 5 shows a close-up view of a valve.

FIG. 5 shows a close-up view of the valve 4. The valve 4 may contain a variety of different dimensions. The valve 4 allows and moderates the movement of liquid from the liquid reservoir 19 and down into the injector 15. The valve 4 may be removable or fixably attached to the platform 7. The valve 4 may be a one-way fluid outlet.

Figure 6:
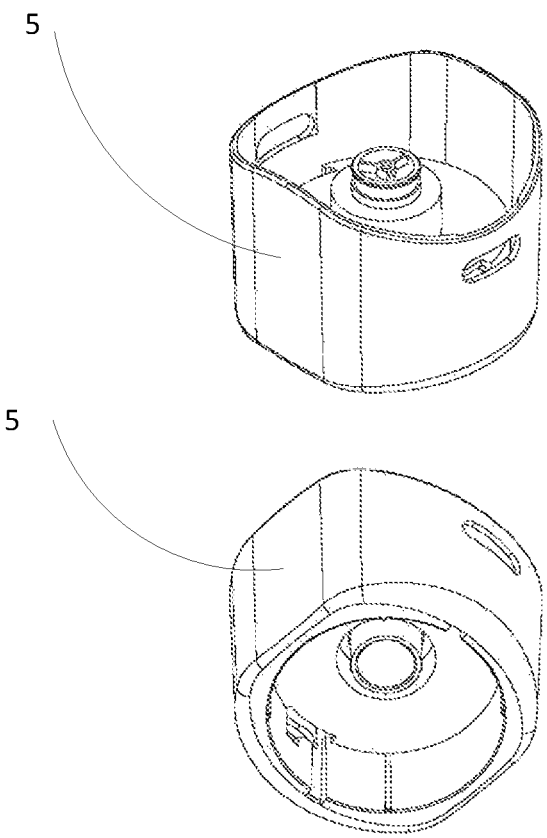
FIG. 6 shows a close-up view of a second portion cover.

FIG. 6 shows a close-up view of the second portion cover 5. The second portion cover 5 may contain a variety of different dimensions. The second portion cover 5 may be molded or extruded to accommodate a tapered area 22, a valve 4, and a seal 3. The second portion cover 5 may provide locking mechanisms 23 for safe use while allowing for easy detachment of the first portion 14 from the second portion 18 for cleaning.

Figure 7:
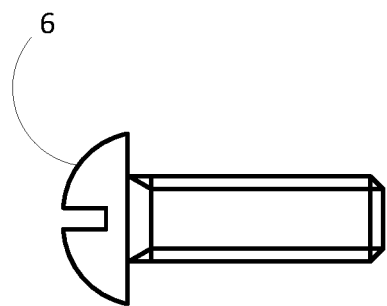
FIG. 7 shows a close-up view of a securing device.

FIG. 7 shows a close-up view of the securing device 6. The securing device 6 may contain a variety of different dimensions. An exemplary securing device 6 may be a screw, nut and bolt, pin, nail, or other linear device to hold at least two portions together. The securing device 6 may be fixably attached or removably attached to a first portion 14 and a second portion 18 or to a platform 7 and a substantially cylindrical portion 2.

Figure 8:
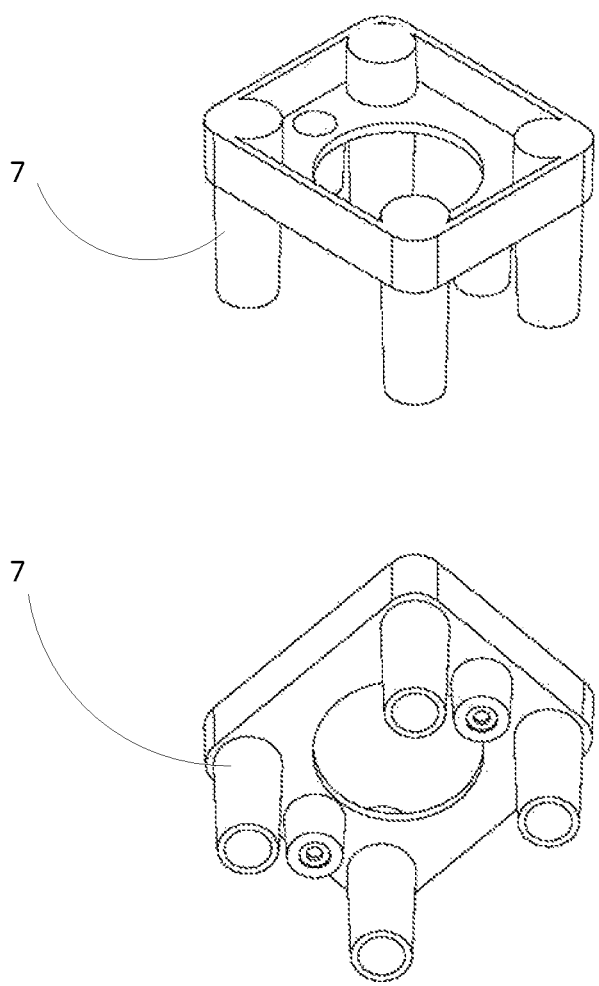
FIG. 8 shows a close-up view of a platform.

FIG. 8 shows a close-up view of the platform 7. The platform 7 may contain a variety of different dimensions. The platform 7 may contain spaces for receiving or connecting to any parts comprising the second portion 18. Securing devices 6 may threat through the platform 7. There may be a central opening to allow the passage of the valves 4, seals 3, and tensioning elements 10 to facilitate the movement of liquid from the liquid reservoir 19 to the injector 15.

Figure 9:
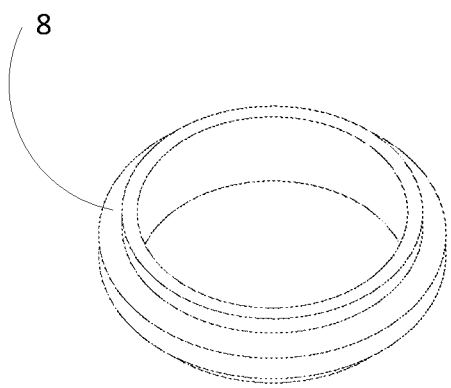
FIG. 9 shows a close-up view of a second seal.

FIG. 9 shows a close-up view of the second seal 8. The second seal 8 may contain a variety of different dimensions. The second seal 8 may be the same or different from that of the seal 3.

Figure 10:
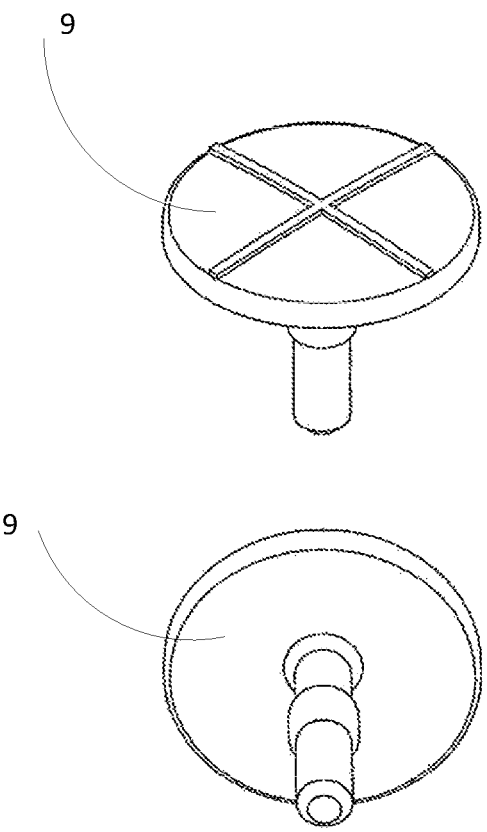
FIG. 10 shows a close-up view of a second valve.

FIG. 10 shows a close-up view of the second valve 9. The second valve 9 may contain a variety of different dimensions. The second valve 9 may be the same or different from that of valve 4.

Figure 11:
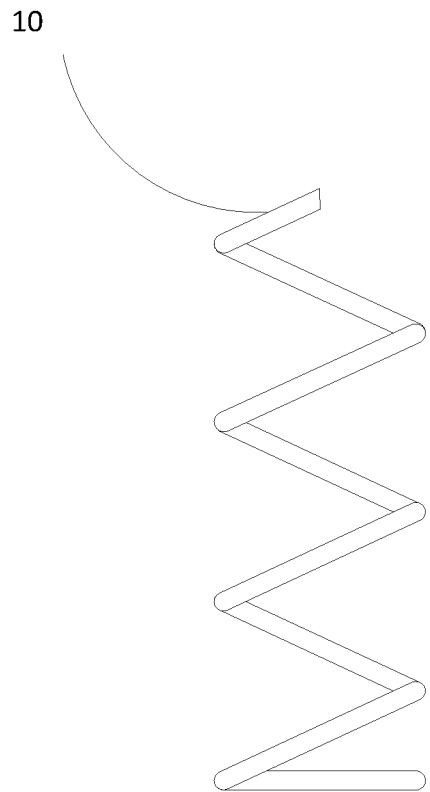
FIG. 11 shows a close-up view of a tensioning element.

FIG. 11 shows a close-up view of the tensioning element 10. The tensioning element 10 may contain a variety of different dimensions. The tensioning element 10 may be a spring as shown in this exemplary embodiment or a tendon. The tensioning element 10, in this disclosure, include elements that may compress, including a spring.

Figure 12:
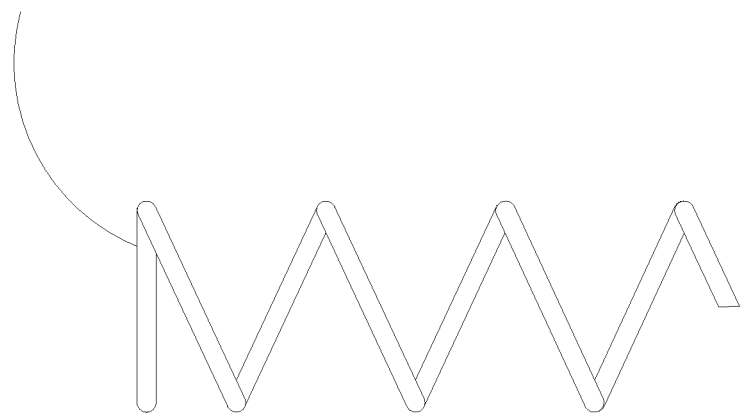
FIG. 12 shows a close-up view of a second tensioning element.

FIG. 12 shows a close-up view of the second tensioning element 11. The second tensioning element 11 may contain a variety of different dimensions. The second tensioning element may be the same as or different from that of tensioning element 10. Tensioning element 10 and second tensioning element 11 may be in a parallel arrangement on opposite ends of the platform 7.

Figure 13:
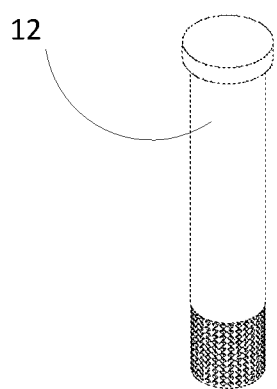
FIG. 13 shows a close-up view of a projection.

FIG. 13 shows a close-up view of the at least one guide 12. The at least one guide 12 may contain a variety of different dimensions. The system 20 may comprise two or four guides 12 arranged about the perimeter or at each corner of the platform 7. The guide 12 may compress, may be solid, or may be hollow. The guide 12 provides stable and firm activation of the system 20 when a user presses down at the first portion cover of the system 20.

Figure 14:
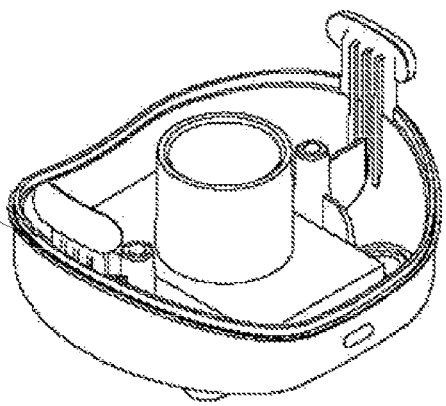
FIG. 14 shows a close-up view of a base.
Figure 14:
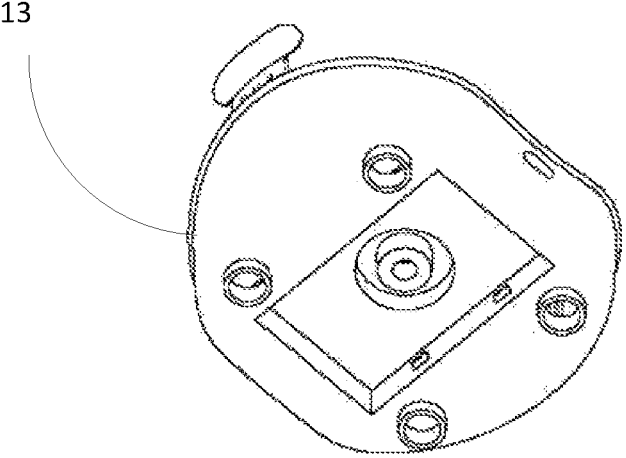

FIG. 14 shows a close-up view of the base 13. The base 13 may contain a variety of different dimensions. The base 13 may contain spaces for receiving or connecting to any parts comprising the second portion 18. Securing devices 6 may threat through the base 13. There may be a central opening to allow the passage of the valves 4, seals 3, and tensioning elements 10 to facilitate the movement of liquid from the liquid reservoir 19 to the injector 15. There may be openings or designated placements for at least one guide 12.

Figure 15:
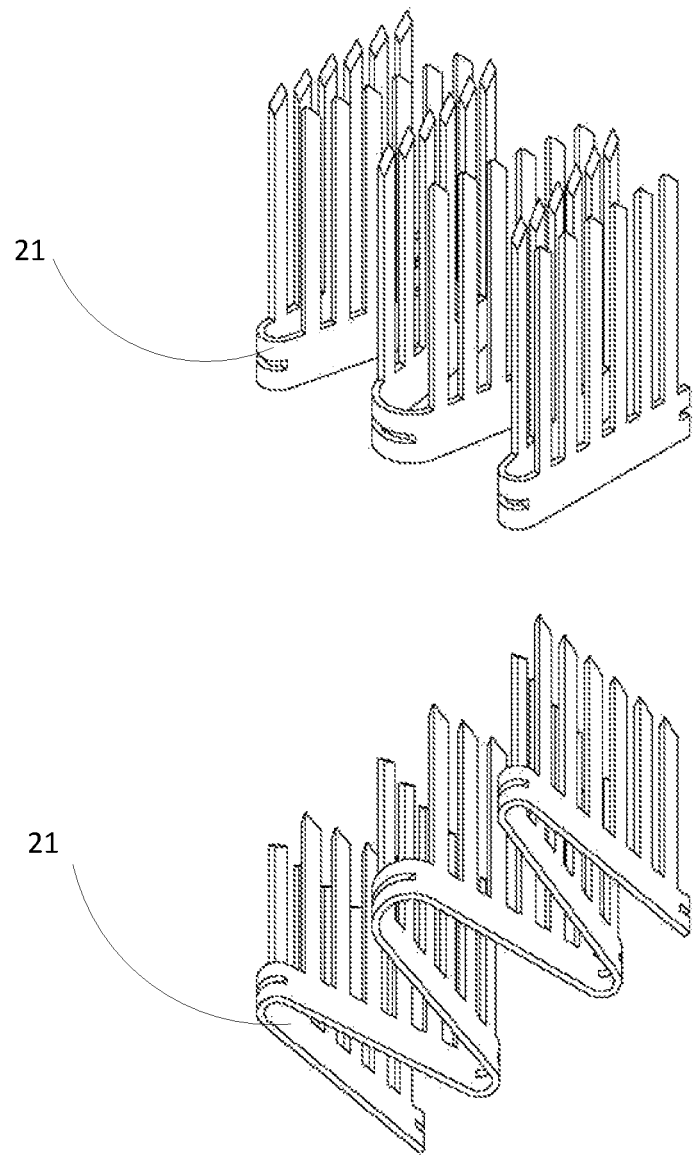
FIG. 15 shows a close-up view of a projection.

FIG. 15 shows a close-up view of the at least one projection 21. The at least one projection 21 may contain a variety of different dimensions. The exemplary projection 21 as shown is organized in a zig-zag configuration and with multiple tapered projections 21 with uniform spacing. The projection 21 may be part of an injector system comprising the at least one projection 21, an injector 15, a valve 4, and a seal 3. The projection 21 and the injector 15 are connected to the platform 7 attached to the base 13 and connected to the liquid reservoir 19 of to first portion 14 by at least one valve 4 and at least one seal 3.

Figure 16:
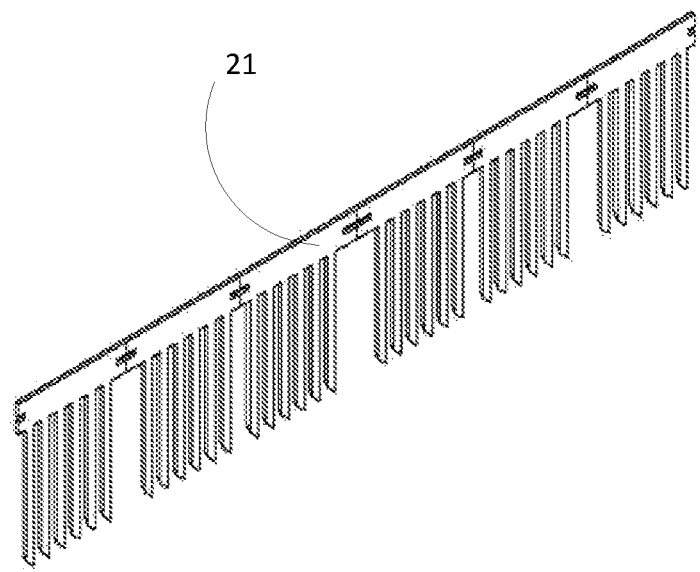
FIG. 16 shows a close-up view of a projection.

FIG. 16 shows a close-up view of the at least one projection 21. The at least one projection 21 may contain a variety of different dimensions. The exemplary projection 21 as shown is organized in a linear configuration and with multiple tapered projections 21 with atypical spacing.

Figure 17:
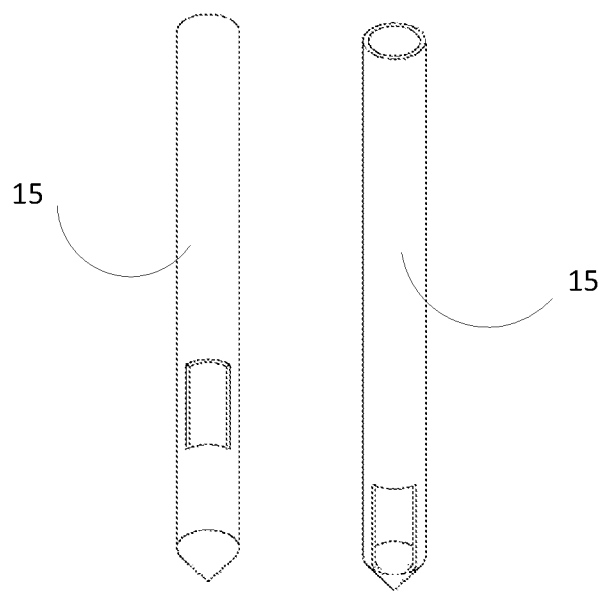
FIG. 17 shows a close-up view of an injector.

FIG. 17 shows a close-up view of the injector 15. The injector 15 may contain a variety of different dimensions. The injector 15 comprises a hollow structure with at least one opening. The injection 15 may have a pointed tip or a tapered tip or a blunt tip. The injector 15 may be of any of the following gauge sizes from 20 to 1". Example gauge sizes may be 10, 00, ⅝", or ¾". The injector 15 have have a length of about 20 mm to about 200 mm. A system 20 may comprise more than one injector 15. For example, a system 20 may comprise 2 to 20 injectors arranged between the projections 21. A system 20 with multiple injectors may be connected to a central valve 4 or 9.

Figure 18:
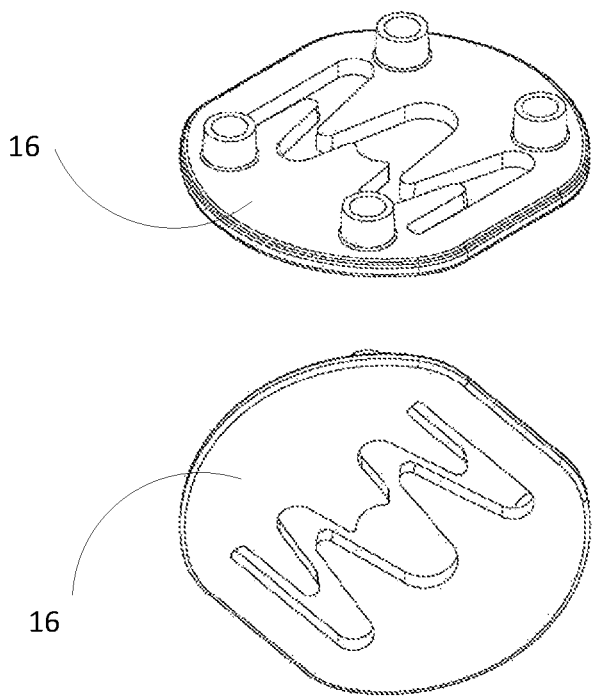
FIG. 18 shows a close-up view of a second platform.

FIG. 18 shows a close-up view of the second platform 16. The second platform 16 may contain a variety of different dimensions. The second platform 16 may be configured to receive at least one securing device 6 or at least one tensioning element 10 or at least one guide 12. The second platform 16 should have a flat and strong surface. The second platform 16 should have an opening sufficient for allowing the protrusion and retraction of the injector 15 and the projection 21 substantially without friction. The second platform 16 is placed on top of the surface of food 25.

Figure 19:
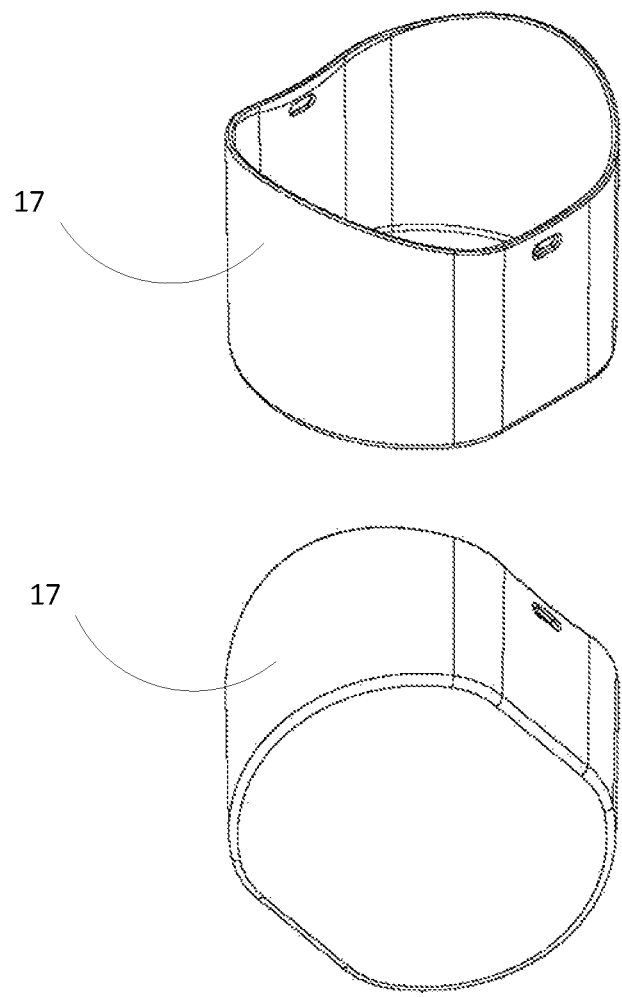
FIG. 19 shows a close-up view of a third cover.

FIG. 19 shows a close-up view of the third cover 19. The third cover 19 may contain a variety of different dimensions. The third cover 19 is preferably removably attached to the system 20 at the second portion 18. The third cover 19 may contain at least one locking mechanism 23. The third cover protects the injector 15, projection 21, and second platform 16 during storage.

Figure 20:
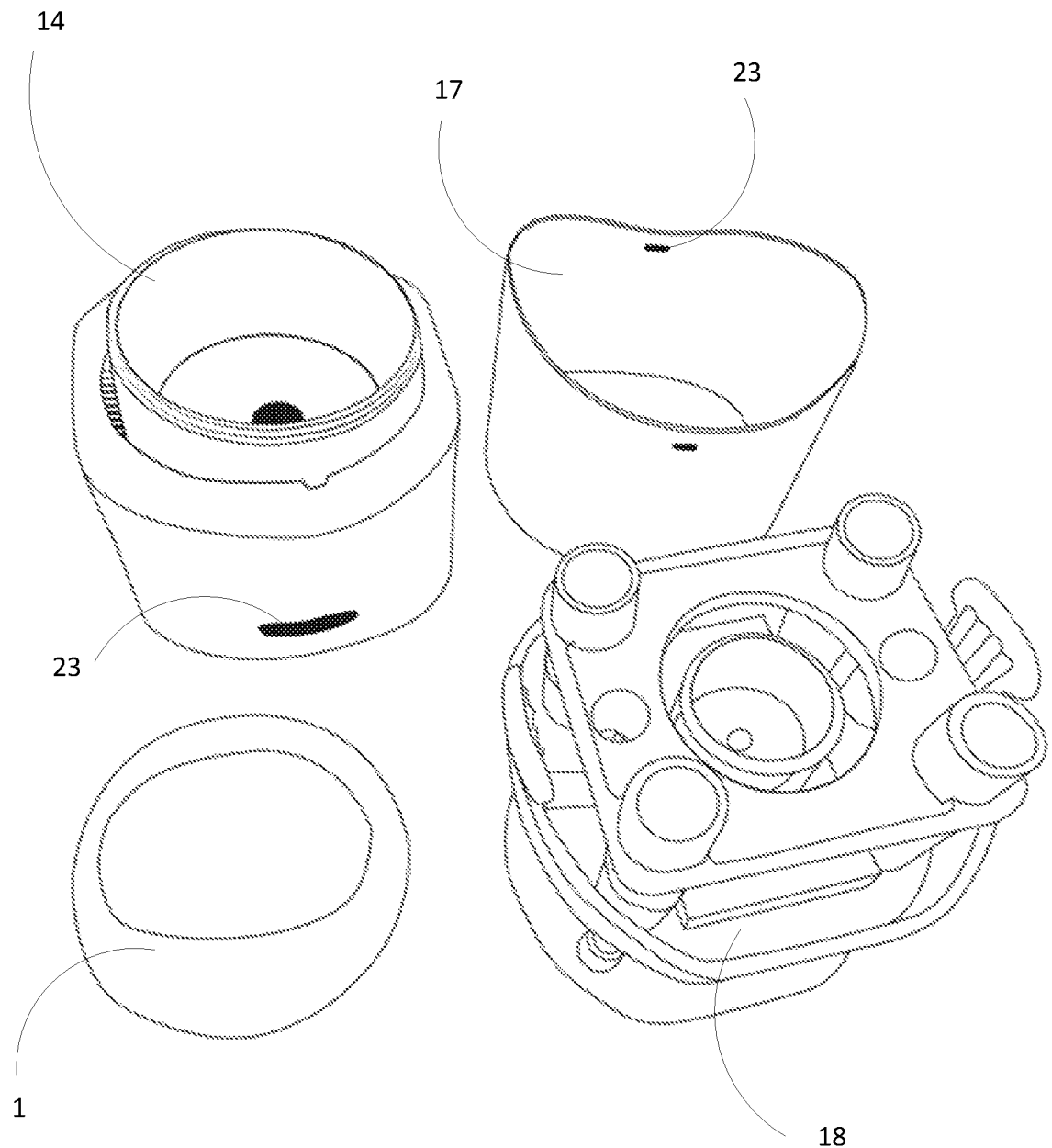
FIG. 20 shows a system separated into a first portion cover, first portion, second portion, and third cover.

FIG. 20 shows the system 20 with the following parts removed from one another: the first portion 14, the first portion cover 1, the second portion 18, and the third cover 17. When cleaning the system 20, a user need only detach the first portion 14 from the second portion 18 by undoing or releasing the at least one locking mechanism 23 on the third cover 17 coupled to the locking mechanism 23 on the first portion 14. The first portion cover 1 may be removed by unscrewing, unsnapping, or unsealing the first portion cover 1 from the substantially cylindrical portion 2 which houses the liquid reservoir 19.

Figure 21:
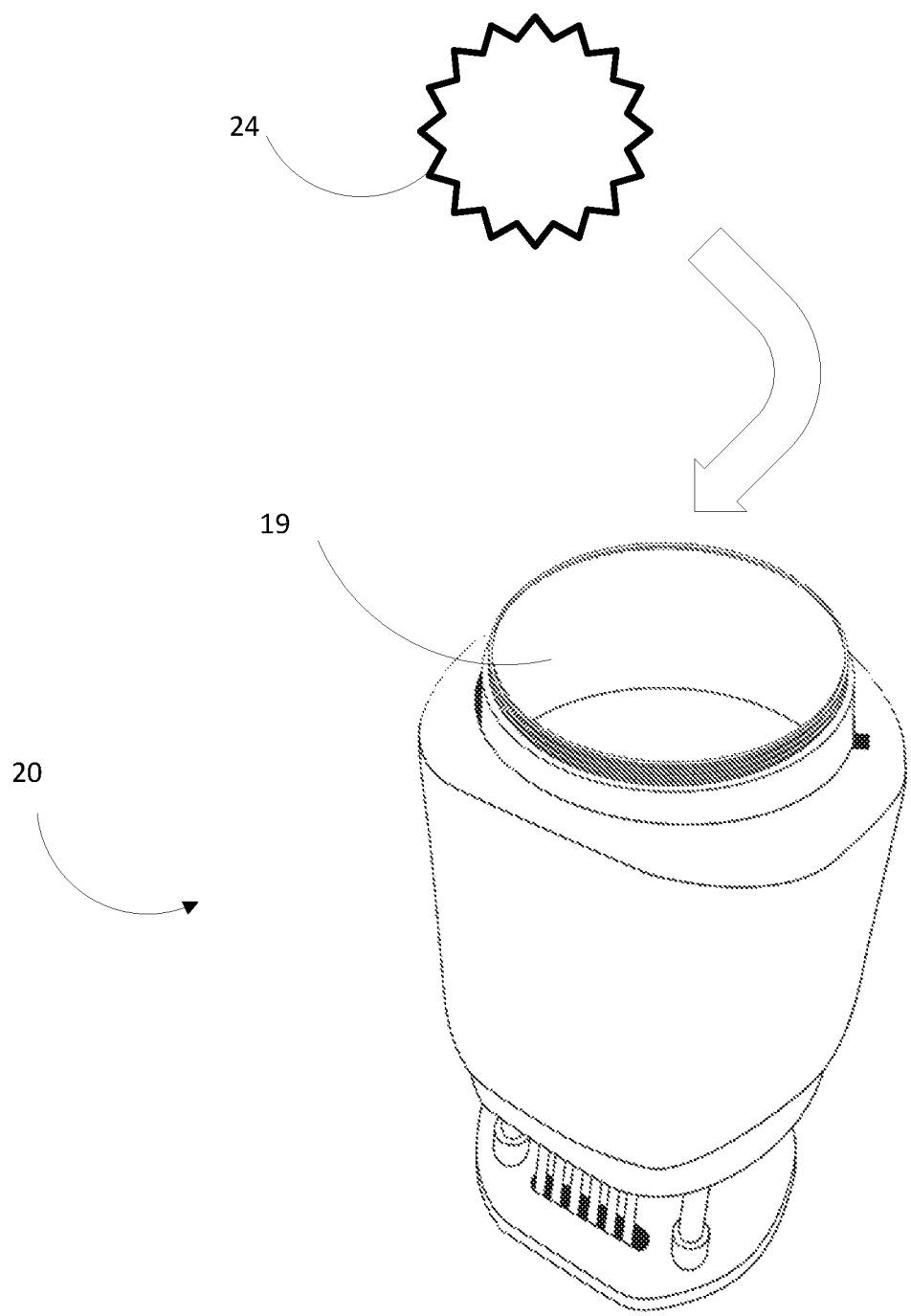
FIG. 21 shows a top perspective view of a system without a first portion cover and third cover but with a marinade packet.

FIG. 21 shows the system 20 with the fluid reservoir 19 uncovered and ready to receive marinade. The marinade should be substantially liquid. Some system 20 embodiments, such as those with larger valves 4 and injectors 15, may accommodate liquid marinades containing herbs, spices, or fruit pulp. Some system 20 embodiments may include at least one marinade packet 24 made out of a natural or synthetic plastic and filled with marinade and sealed. Some marinade packets 24 may be opened and then the contents disposed of into the liquid reservoir 19. In other embodiments, a valve 4 may pierce the marinade packet 24 when the marinade packet 24 is inserted into the liquid reservoir 19 and the first portion cover 1 secured onto the substantially cylindrical portion 2 where the liquid reservoir 19 is located. This embodiment may allow for easier cleaning of the liquid reservoir 19—only the emptied or used marinade packet 24 will need to be removed and discarded.

Figure 22:
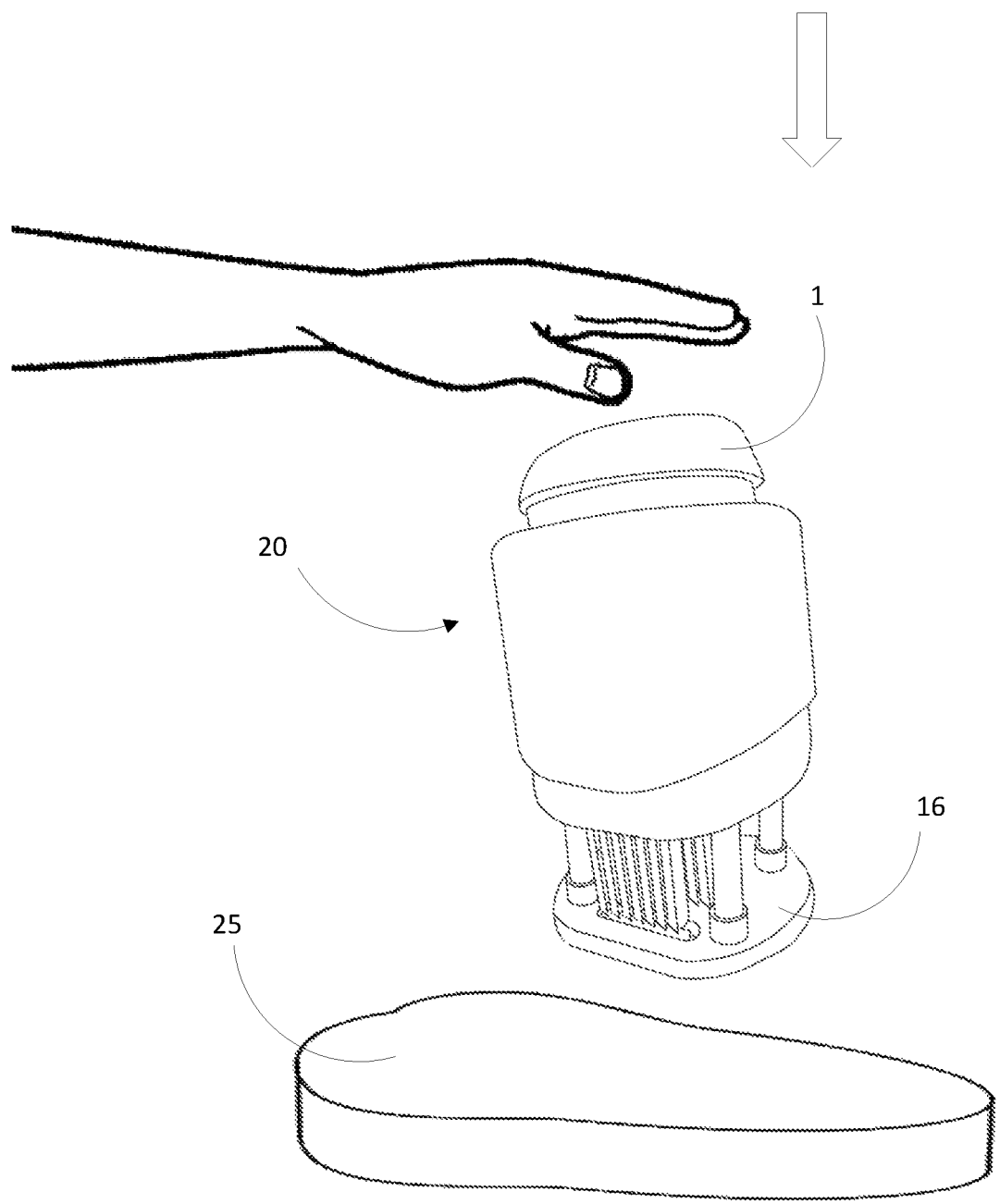
FIG. 22 shows a user pressing a system into food to marinade and tenderize.

FIG. 22 shows how the apparatus can be compressed which causes the at least one projection 21 and the injector 15 to move in relation to the second platform 16. The compression may occur where a user places a hand over the first portion cover 1 or the at least substantially cylindrical portion 2 and applies force which causes the at least one projection 21 and the injector 15 to move in relation to the second platform 16. An axial compression force may be applied to the first portion 14 which causes fluid to be expelled from the first portion 14 into the section portion 18. Simultaneously, the at least one projection 21 and the injector 15 are movable axially such that the fluid, the at least one projection 21 and the injector 15 move in the same direction.

The liquid reservoir 19 may or may not be filled prior to using the system 20. A user places the second platform 16 on top of the food 25 surface. The user with his or her hand may grab the system 20 by the second portion cover 5 or on top of the first portion cover 1. The user may apply pressure downward, firmly pressing the second platform 16 onto the surface of the food 25, slightly indenting the food 25. This user may release the downward pressure and place the second platform 16 onto a different section of the food 25.

Figure 23:
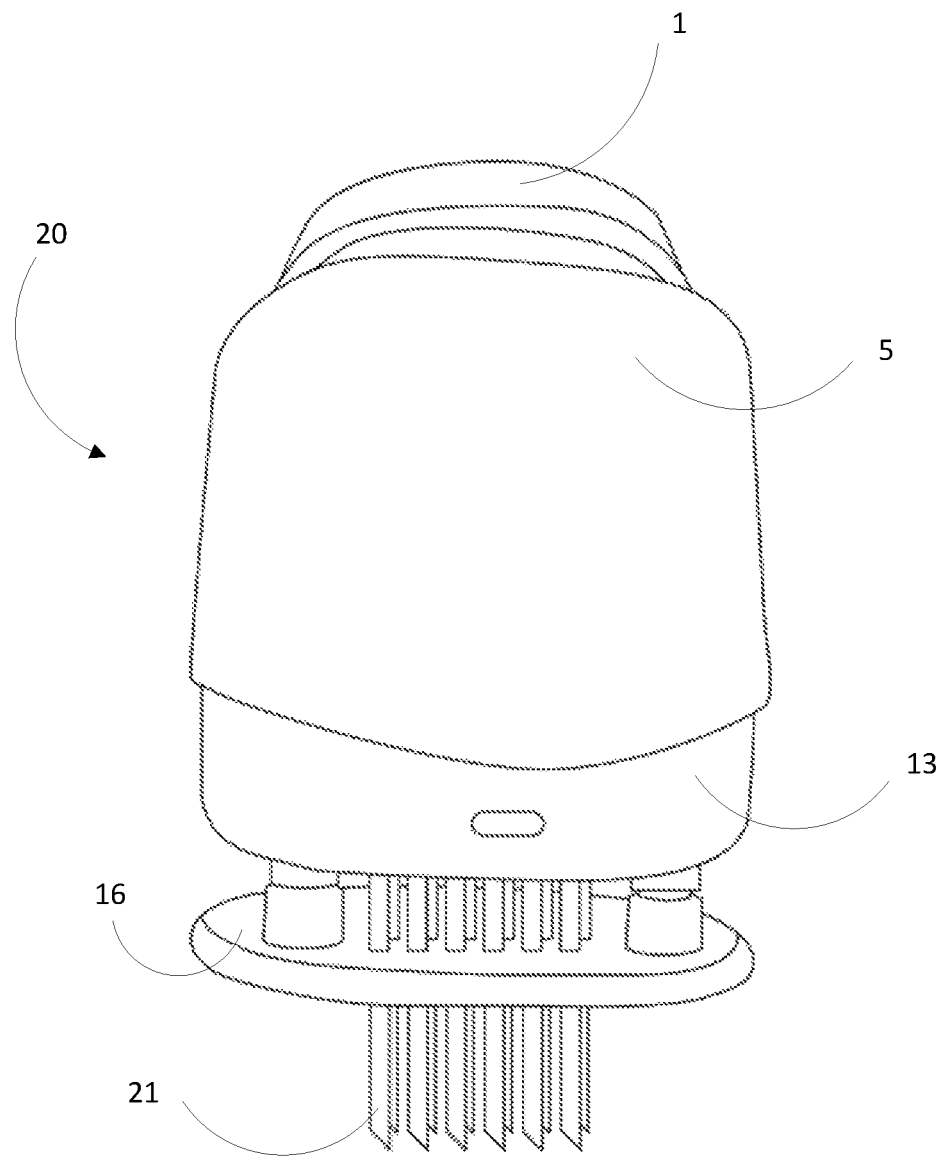
FIG. 23 shows a perspective view of a system in an activated position.

FIG. 23 shows a perspective view of the system 20 in the activated position. In the activated position, the downward pressure applied to the first portion cover 1 causes the second portion 18 to move downward, tensioned by the tensioning element 10 and 11 in some embodiments and along the at least one guide 12. The platform 7 and the base 13 secured by at least one securing device 6 move as one piece downward toward the second platform 16 resting on the surface of the target food 25. The downward movement pushes the projection 21 and the injector 15 down through the second platform 16 openings and into the target food 25. When the downward pressure is released, the platform 7 and the base 13 move upward along the guide 12 back to the deactivated position where the injector 15 and the projection 21 are substantially flush with the second platform 16 or slightly above the second platform 16.

In some methods, the person using the tenderizing apparatus with a fluid reservoir 20 would remove the first portion cover 1 and fill the liquid reservoir 19 with a liquid. The user would remove the third cover 17 and the second platform 16 would be placed over the food. The first portion cover 1 may be depressable and when a user depresses the first portion cover 1 the first portion cover 1 is depressed from a first position to a second position. When the first portion cover 1 is depressed from a first position to a second position the at least one projection 21 and the injector 15 protrude and penetrate the surface of the food tenderizing the food and marinating the food.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A food tenderizer with a fluid reservoir system configured to provide food marinating and tenderizing, the system comprising:
   a first portion comprising a substantially cylindrical portion housing a liquid reservoir with a tapered area and at least one seal, and the first portion protected by a removably attached first portion cover;
   a second portion downward from the first portion, the second portion comprising a platform attached to a base with a securing device and further connected to a second platform by a tensioning element and a guide;
   an injector system comprising a valve, a seal, a projection, and an injector, wherein the projection and the injector are connected to the platform attached to the base;
   wherein the projection and the injector of the injector system are connected to the liquid reservoir of the first portion by at least one valve and at least one seal; and
   wherein the first portion and the second portion are protected by a second portion cover and a removable third cover.

2. The system of claim 1, wherein the valve is a one-way fluid outlet.

3. The system of claim 1, wherein the injector is a needle comprises at least one opening and one tip and has a length of about 20 mm to about 200 mm and a gauge from about 20 to 1".

4. The system of claim 1, wherein the tensioning element is a spring.

5. The system of claim 1, wherein the projection is a bridge of blades configured a zig-zag pattern.

6. The system of claim 1, wherein the projection is bridge of blades configured in a linear pattern.

7. The system of claim 1, further comprising a marinade packet configured for placement inside the liquid reservoir, and the liquid reservoir configured to receive the marinade packet.

8. The system of claim 5, wherein the projection blades are irregularly spaced.

9. The system of claim 5, wherein the projection blades are regularly spaced.

10. The system of claim 6, wherein the projection blades are irregularly spaced.

11. The system of claim 6, wherein the projection blades are regularly spaced.

12. The injector system of claim 1, further comprising at least one additional injector.

13. The injector system of claim 1, wherein the projection is flush with or above the second platform in a deactivated position.

14. The injector system of claim 1, wherein the projection is below the second platform in an activated position.

15. The second platform of claim 1, wherein the second platform comprises a central opening sufficient to allow the passage of a projection and an injector with substantially no friction.

16. The system of claim 1, wherein the first portion and the second portion are interchangeable.

17. A method of utilizing the food tenderizer with a fluid reservoir system of claim 1, the method steps comprising:
   actuating the food tenderizer with a fluid reservoir system of claim 1, actuation including transitioning from a first configuration to a second configuration where in the second configuration the projection extends downward into food and releases a fluid from a first portion.

18. The method steps of claim 17 further comprising removing a first portion cover;
   placing a marinade packet inside a fluid reservoir;
   puncturing the marinade packet; and
   replacing the first portion cover.

19. The method steps of claim 17 further comprising releasing a locking mechanism of a second portion cover by squeezing the locking mechanism; and
   removing the second portion cover by pulling the second portion cover upward and away from a platform connected to a base.

20. The method steps of claim 17 further comprising securing the system for safe storage by placing a base connected to a platform and comprising an injector system inside a third cover;
   fastening a locking mechanism on the base to a locking mechanism on a second portion cover by placing the second portion cover over the injector system inside the third cover; and
   replacing the first portion cover onto a substantially cylindrical portion housing a liquid reservoir.

* * * * *